Feb. 23, 1943.  N. E. WAHLBERG  2,312,277
PEDAL
Filed Sept. 3, 1940
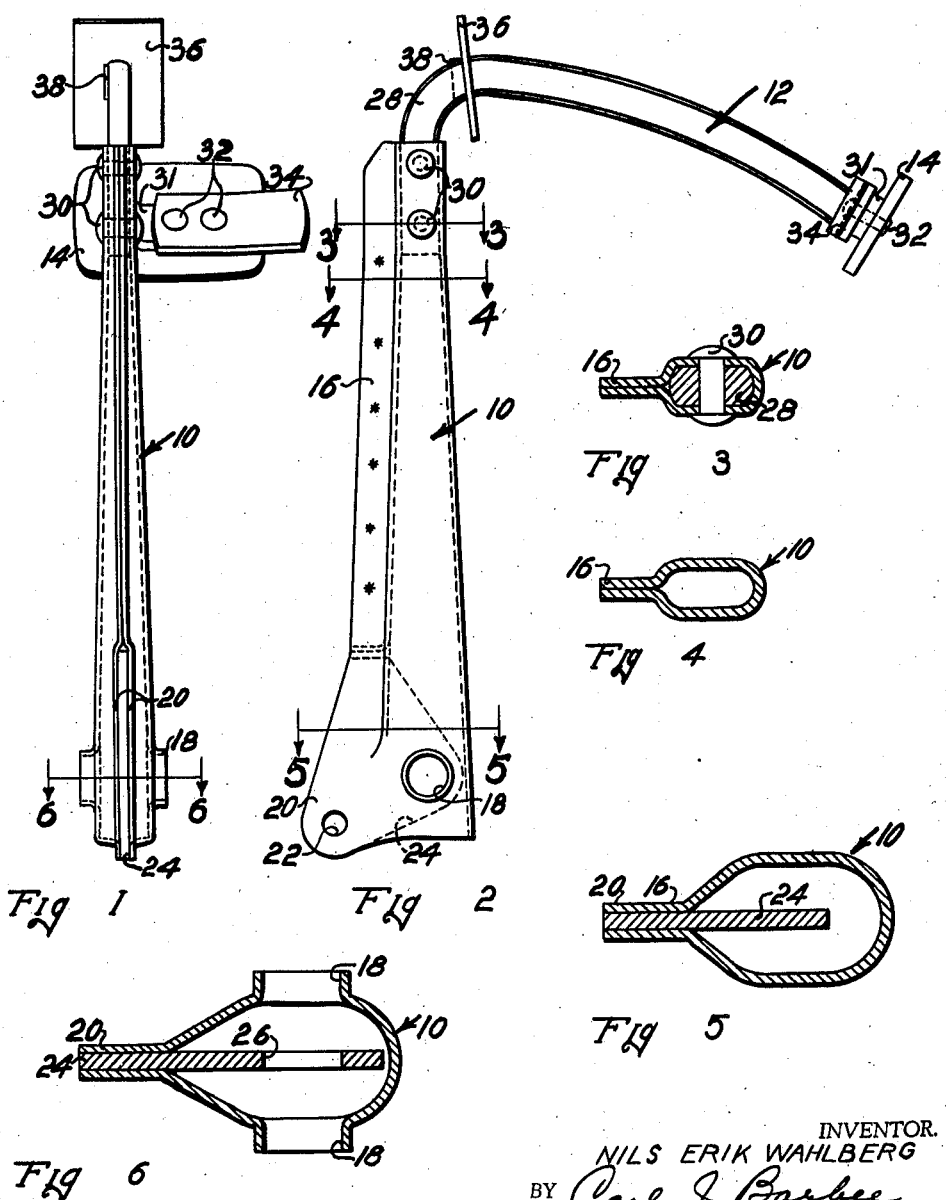
INVENTOR.
NILS ERIK WAHLBERG
BY
his ATTORNEY.

Patented Feb. 23, 1943

2,312,277

UNITED STATES PATENT OFFICE 2,312,277

PEDAL

Nils Erik Wahlberg, Kenosha, Wis., assignor to Nash-Kelvinator Corporation, Kenosha, Wis., a corporation of Maryland Application September 3, 1940, Serial No. 355,169

17 Claims. (Cl. 74—560)

This invention relates to pedals and has particular reference to control pedals such as are used for operating the clutch and brakes of an automotive vehicle.

It is an object of this invention to provide a pedal which will be lighter and cheaper to construct than pedals used heretofore.

It is another object of this invention to provide a pedal, the arm of which is of folded sheet metal construction.

It is another object of this invention to provide a pedal of folded sheet metal construction which is reenforced at the points of greatest stress.

Other objects and advantages of this invention will be apparent from the following description and claims and the attached drawings of which there is one sheet and in which—

Figure 1 represents a bottom plan view of the pedal;

Figure 2 represents a side elevation of the pedal;

Figure 3 represents a section taken along a plane indicated by the line 3—3 in Figure 2 and looking in the direction of the arrows;

Figure 4 represents a section taken along a plane indicated by the line 4—4 in Figure 2 and looking in the direction of the arrows;

Figure 5 represents a section taken along a plane indicated by the line 5—5 in Figure 2 and looking in the direction of the arrows;

Figure 6 represents a section taken along a plane indicated by the line 6—6 in Figure 1 and looking in the direction of the arrows.

The pedal consists generally of an arm section 10, and a rim section 12, on the end of which is mounted an operating pad 14. The arm section 10 is made of folded sheet metal construction in which a sheet of metal is stamped or folded into a hollow generally rectangular cross section with flanges 16 extending below the hollow cross sectional portion. The flanges 16 are secured together as by spot welding and form a rib along the lower edge of the arm. The arm 10 increases in cross sectional dimension as it approaches the lower end, and the side walls of the arm are pierced and extruded as at 18. At the lower end of the arm 10 the flanges 16 are enlarged so as to form a crank portion 20 which is apertured as at 22 (see Figure 2). The crank portions 20 of the flanges 16 and the lower end of the arm 10 are reenforced by a flat plate 24 which is secured, as by welding, between the crank portions 20 of the flanges 16 and extends into the hollow cross sectional portion of the arm 10. Plate 24 is pierced as at 26 to form a hole which is co-axially aligned with the extruded holes 18 in the sides of the arm 10. The plate 24 is also pierced to form a hole co-axial with the holes 22 in the crank portions 20.

The rim 12 is formed by forging or bending bar stock into a generally arcuate shape about the aperture 18 as a center. The lower end of the rim is bent radially inwardly as at 28 and fits within the hollow cross sectional portion of the arm 10 where it is secured as by rivets 30. The upper end of the rim 12 is bent at right angles from the plane of the arm and rim as at 31 and is flattened so as to receive the pad 14 which is secured to the bent over portion 31 by rivets 32. The rivets 32 also secure a metal finger 34 to the under side of the bent over portion 30. The finger 34 is bent downwardly away from the pad 14 and projects beyond the side of the pad 14. The finger is operable to contact and depress an auxiliary switch such as the starter button of the automobile when the pedal is pressed completely down. The finger is bent away from the back of the pad 14 so that a suitable rubber pad (not shown) may be fitted over the metal pad 14 if desired.

Positioned near the lower end of the rim portion 12 is a stop plate 36 which is punched in the center so as to fit over the rim 12. One side of the punched portion is bent down in a tab 38 which may be welded to the side of the rim portion 12 to secure the stop plate in place. The stop plate 36 is arranged to engage the bottom surface of the toe board of an automobile to limit the upward movement of the pedal.

The pedal is arranged to be supported upon a shaft (not shown) which may be passed through the extruded holes 18 in the end of the arm 10 and through the aperture 26 in the reenforcing plate 24. The apertures 22 in the crank portion 20 of the pedal is offset from the aperture 18 and is adapted to receive a lever for connecting the pedal to a clutch or brake mechanism for operating the mechanism by the pedal. It will be noted that the arm portion 10 has a generally straight upper edge and is symmetrical about the upper edge so that the extruded portions 18 and the flanges 16 and crank portions 20 may be formed in their proper planes with respect to the sides of the arm 10 at the same time that the arm is stamped from a sheet of metal. After the blank has been stamped and shaped, it is a simple operation to fold the sides of the arm about its upper edge to form the completed arm 10. The pedal is reenforced where it is connected to its supporting shaft and the mechanism to be controlled by the plate 24, and at its upper end where the shear forces of the rim portion are applied to the arm by the bent over portion 28 of the rim 12. The mid-section of the arm 10 is subjected mainly to bending forces which are easily withstood by the hollow cross section of the arm.

While I have described my invention in some detail, I intend this description to be an example only and not as a limitation of my invention to which I make the following claims:

1. A pedal comprising an arm portion of folded metal construction forming a box section, flanges extending from said box section along one side thereof, a reinforcing plate having an edge portion secured between said flanges at one end of said box section and having its other edge portion extending into but spaced from the walls of said box section, and a rim portion of solid cross section secured to the other end of said arm portion.

2. A pedal comprising an arm portion of folded metal construction having a box section, a rim portion of solid cross section secured to one end of said arm portion, said rim portion being secured within the end of said folded arm portion, flanges extending from one side of said box section, and a reinforcing plate secured between said flanges at the other end of said box section, said plate extending into said box section and having a portion spaced from the walls of said box section defining an aperture for receiving a supporting member for said arm.

3. A pedal comprising an arm portion of folded metal construction having a box section, flanges integral with said box section and secured together along one side of said box section to form an edge portion, and a rim portion of constant solid cross section.

4. A pedal comprising an open ended arm portion of folded metal construction having a box section, and a rim portion of constant solid cross section, said rim portion having a bent over end section secured within the open end of said box section.

5. A pedal comprising an arm portion of folded metal construction, said arm having a box section with flanges extending from one edge thereof, said flanges being secured together throughout most of their length, a reinforcing plate secured between said flanges at one end of said arm portion and extending into said box section, and a rim portion of solid cross section secured within the box section of said arm portion.

6. A pedal comprising an arm portion of folded metal construction, said arm having a hollow cross section with flanges extending from one edge thereof, and a rim section of solid cross section secured within the hollow cross section of said arm portion, the end of said hollow arm portion opposite said rim portion being extruded and pierced to receive a supporting shaft.

7. A pedal comprising an arm portion of folded metal construction having a hollow cross section increasing in size toward the lower end thereof, flanges formed along one edge of said hollow portion, said flanges being increased in size to form a crank portion near the lower end of said arm, and an extruded portion at the lower end of said arm.

8. A pedal comprising an arm portion of folded metal construction having a hollow cross section increasing in size toward the lower end thereof, flanges formed along one edge of said hollow portion, said flanges being increased in size to form a crank portion near the lower end of said arm, an extruded portion at the lower end of said arm, and a plate, the lower end of said arm being reenforced by said plate secured between the crank portions of said flanges and extending into the hollow section of said arm.

9. A pedal comprising an arm portion of folded metal construction having a hollow cross section increasing in size toward the lower end thereof, flanges formed along one edge of said hollow portion, said flanges being increased in size to form crank portions near the lower end of said arm, an extruded portion at the lower end of said arm, and a plate, the lower end of said arm being reenforced by said plate secured between the crank portions of said flanges and extending into the hollow section of said arm, said plate and crank portions of said flanges being pierced to receive an operating connection.

10. Pedal structure comprising an arm portion of sheet metal construction, said arm including spaced side portions, flanges bent from the free edges of said side portions into abutting relationship, and crank portions extending from one end of said side portions in spaced relationship, said flanges being symmetrical about an edge of said arm portion.

11. A pedal having an arm portion of folded sheet metal and including side wall portions, said side wall portions being extruded around apertures at one end, and flanges integral with and extending along the edges of and parallel to said side wall portions, said flanges and extruded portions being symmetrical with respect to an axis extending through the central portion of the end wall opposite said flanges.

12. Pedal structure comprising an arm of folded sheet metal having a hollow cross section, the sides of said arm having mating flanges extending along one edge thereof, said flanges being welded together, and a reinforcing plate secured between said flanges and extending into said hollow cross section, said plate defining an aperture, the sides of said arm defining extruded apertures aligned with said first mentioned aperture.

13. Pedal structure comprising an arm of folded sheet metal construction having a hollow cross section, mating flanges extending from the sides of said arm and along one edge thereof, the ends of said flanges being increased in size to form a crank extending from the edge of said arm, and a reenforcing plate secured between the crank portions of said flanges.

14. A pedal comprising an arm portion of box section including a sheet metal member having a folded edge and a flanged edge and a reinforcing plate positioned between the flanges of said flanged edge and extending into said box section and having its free edge spaced from the walls of said box section.

15. A pedal construction comprising a member of box section and a reinforcing plate extending through one side of said member into said box section in spaced relationship with respect to the walls of said box section.

16. A pedal construction comprising an arm of tubular cross section, pierced and outwardly extruded portions in said arm at one end thereof, and a reinforcing plate secured at one edge to said arm and having its other edge extending into said tubular section adjacent said pierced and extruded portions.

17. A pedal construction comprising an arm of tubular cross section, pierced and outwardly extruded portions in said arm at one end thereof, and a reinforcing plate secured at one edge to said arm and having its other edge extending into said tubular section adjacent said pierced and extruded portions, said plate defining an aperture aligned with the apertures defined by said extruded portions.

NILS ERIK WAHLBERG.